Patented July 10, 1951

2,560,509

UNITED STATES PATENT OFFICE 2,560,509

NUT BUTTERS

Benjamin R. Harris and Morris H. Joffe, Chicago, Ill., assignors to The Emulsol Corporation, Chicago, Ill., a corporation of Illinois No Drawing. Application December 21, 1944,
Serial No. 569,259

6 Claims. (Cl. 99—128)

This invention relates to the preparation of improved nut butters, particularly peanut butter.

Conventional nut butters, which are usually prepared by grinding or comminuting nut meats to form a pasty product in which the solid nut particles are suspended in an oily medium, suffer from a series of disadvantages. Thus, for example, the products have a cloying effect, tending to adhere to the roof of the mouth when eaten and being dislodged therefrom only with difficulty. Another objectionable feature of such products has been the tendency of a portion of the oil content thereof to separate from the product and rise to the surface thereof. A still further objection to such products is their peculiar rheological behavior which renders difficult the spreading thereof on bread, crackers and the like.

It has, heretofore, been suggested, in order to overcome the defects of cloying and oil separation in nut butters, to remove a major portion of the oil from the nut meats and to replace the same by a hydrogenated edible oil. It has also been proposed, in order to obviate these two defects in nut butters, to incorporate therein a small percentage of a fatty acid mono- or diglyceride such as monostearin or distearin or mixtures thereof. While such procedures, under certain conditions, serve reasonably well to reduce cloying and oil separation, they do not, in general, bring about any improvement or appreciable improvement in the spreading properties of the nut butters.

In accordance with the present invention, it has been found that nut butters may be materially improved not only with reference to reducing cloying and oil separation but also with respect to their plasticity characteristics. This is accomplished by the incorporation into the nut butter, under certain conditions hereinafter described, of higher molecular weight fatty and partial esters of polyglycerols, particularly such partial esters as are solid at ordinary room temperatures.

In order to obtain these results, it has been found to be important that the nut butter and the partial ester of the poylglycerol be maintained in contact with each other for at least a short period of time at a temperature not substantially below 50 degrees C. and preferably at a temperature ranging from about 55 to about 80 degrees C. This may be accomplished in a variety of ways. Thus, for example, a previously prepared nut butter, with or without condiments such as salt, sugar and the like, may be held at a temperature of about 55 to about 80 degrees C. and the requisite amount of the melted partial ester of the polyglycerol added thereto and thoroughly mixed therewith to effect a substantially uniform distribution of the ester through the nut butter. In an alternative method, the partial ester of the polyglycerol may be dissolved in an oil, which may be peanut oil or other edible oil or may be a part of the oil previously separated from the nut meats used in making the nut butter, and the resulting oily solution incorporated in the previously ground nut meats, the resulting mixture then being maintained at a temperature not less substantially than 50 degrees C. for at least a few minutes. Still another method comprises distributing the partial ester of the polyglycerol, preferably in melted form, over the nut meats and then grinding or comminuting said meats to convert the same into a nut butter. The nut butter, while being vigorously agitated, is exposed to a temperature substantially above room temperature, preferably for not less than 15 minutes beginning with the time that the entire mass has been raised to the desired temperature. Other methods will suggest themselves to those versed in the art, it being understood that, in all cases, it is important, if uniformly good results are to be obtained, that at least during some stage of the preparation of the nut butter it be maintained in contact with the partial ester of the polyglycerol at a temperature not substantially below 50 degrees C. for a sufficient length of time to secure the optimum effect of the polyglyceride addition agent.

The exact mechanism of the effect of the temperature and duration of heating has not been ascertained. Where a temperature of the order of room temperature is utilized, as distinguished from one not substantially below 50 degrees C., then markedly inferior results are obtained. This situation is to be contrasted with that, for example, where monostearin is utilized. The thorough incorporation of monostearin into peanut butter at temperatures of the order of 50 to 80 degrees C. results in the production of a peanut butter in which oil separation is quite pronounced. On the other hand, the thorough incorporation into peanut butter of the stearic acid mono-ester of a mixture of polyglycerols having an average molecular weight of that of diglycerol under exactly the same conditions results in the production of a peanut butter which shows no evidence of oil separation.

In an illustrative example of the practice of the present invention, 100 pounds of peanuts, after suitable known preliminary treatments such as blanching, roasting, germ removal and the like, are pressed to remove about 10% of the oil content thereof. The press-cake is then ground to the desired degree of fineness, salt and/or sugar being admixed therewith. To the resulting ground mass, maintained at 55 to 65 degrees C., there are added 3 pounds of a stearic acid partial ester of a polyglycerol (produced as described in Example 14 of Reissue Patent No. 21,322) previously dissolved in the previously removed peanut oil, and the resulting mass is mixed well in order to form a homogeneous product, and maintained at approximately 55 to 65 degrees C. for a period of 15 to 30 minutes. The product may then be packaged and allowed to cool to room temperature. The peanut butter thus produced shows no objectionable sticking to the roof of the mouth, may be stored and aged without incurring danger of oil separation and is characterized, further, by a material improvement in plasticity and spreadability.

The higher molecular weight fatty acid partial esters of the polyglycerols which are utilized in accordance with the present invention are disclosed in Patent No. 2,022,766 and Reissue Patent No. 21,322. As previously indicated, it is preferred particularly to utilize such of said esters as are solid at normal or ordinary room temperatures. Those derived from normally solid higher molecular weight fatty acids or mixtures of fatty acids, such as palmitic acid, hydroxystearic acid, stearic acid, mixtures thereof, so-called "triple-pressed stearic acid" and the like are, thus, indicated. Mixtures comprising from about 40 to 50% of stearic acid and the remainder largely palmitic acid; and products comprising predominately stearic acid with the balance largely palmitic acid with minor proportions of unsaturated acids, which products have an iodine number of about 4 to about 6, are very satisfactory sources of fatty acids.

The proportions of the partial esters of polyglycerols utilized in the nut butters are, in all cases, small. In the usual case, about 2% to about 3%, by weight, of the nut butter is satisfactory. The proportions may, however, vary, preferably, from about 1% to about 8%.

While the invention is especially useful in connection with peanut butter, it is also applicable to nut butters generally, such as those derived from cashew nuts, walnuts, pecans, almonds, and the like as well as mixtures of two or more different kinds of nuts.

What is claimed as new and desired to be protected by Letters Patent of the United States is:

1. A method of preparing nut butters of improved character which comprises thoroughly admixing with a nut butter a minor proportion of a higher molecular weight fatty acid partial ester of a polyglycerol, maintaining the mixture at a temperature not substantially below 50 degrees C., and then allowing the mixture to cool to room temperature.

2. A method of preparing nut butters of improved character which comprises thoroughly admixing with a nut butter a minor proportion of a higher molecular weight fatty acid partial ester of a polyglycerol, which ester is solid at room temperatures, maintaining the mixture at a temperature not substantially below 50 degrees C., and then allowing the mixture to cool to room temperature.

3. A method of preparing peanut butter of improved character which comprises thoroughly admixing with a peanut butter a minor proportion of a higher molecular weight fatty acid partial ester of a polyglycerol, which ester is solid at room temperatures, maintaining the mixture at a temperature not substantially below 50 degrees C., and then allowing the mixture to cool to room temperature.

4. A method of preparing peanut butter of improved character which comprises thoroughly admixing with a peanut butter from about 1% to about 5% of a stearic acid partial ester of a polyglycerol, maintaining the mixture at a temperature not substantially below 50 degrees C., and then allowing the mixture to cool to room temperature.

5. A method of preparing peanut butter of improved character which comprises thoroughly admixing with comminuted peanuts a minor proportion of a higher molecular weight fatty acid partial ester of a polyglycerol dissolved in peanut oil, said ester being solid at room temperatures, the peanut butter, during or subsequent to the incorporation of said ester, being maintained at a temperature not substantially below 50 degrees C., and then allowing the mixture to cool to room temperature.

6. In a method of preparing peanut butter of improved character wherein comminuted peanuts are admixed with a minor proportion of a higher molecular weight fatty acid partial ester of a polyglycerol, which ester is solid at room temperatures, the step which comprises maintaining the peanut butter, during or subsequent to the incorporation of said ester, at a temperature not substantially below 50 degrees C., and then allowing the mixture to cool to room temperature.

BENJAMIN R. HARRIS.
MORRIS H. JOFFE.

REFERENCES CITED

The following references are of record in the file of this patent:

UNITED STATES PATENTS

| Number | Name | Date |
| --- | --- | --- |
| Re. 21,322 | Harris | Jan. 16, 1940 |
| 1,395,934 | Stockton | Nov. 1, 1921 |
| 1,926,369 | Brown | Sept. 12, 1933 |
| 2,022,766 | Harris | Dec. 3, 1935 |